United States Patent Office 3,465,727
Patented Sept. 9, 1969

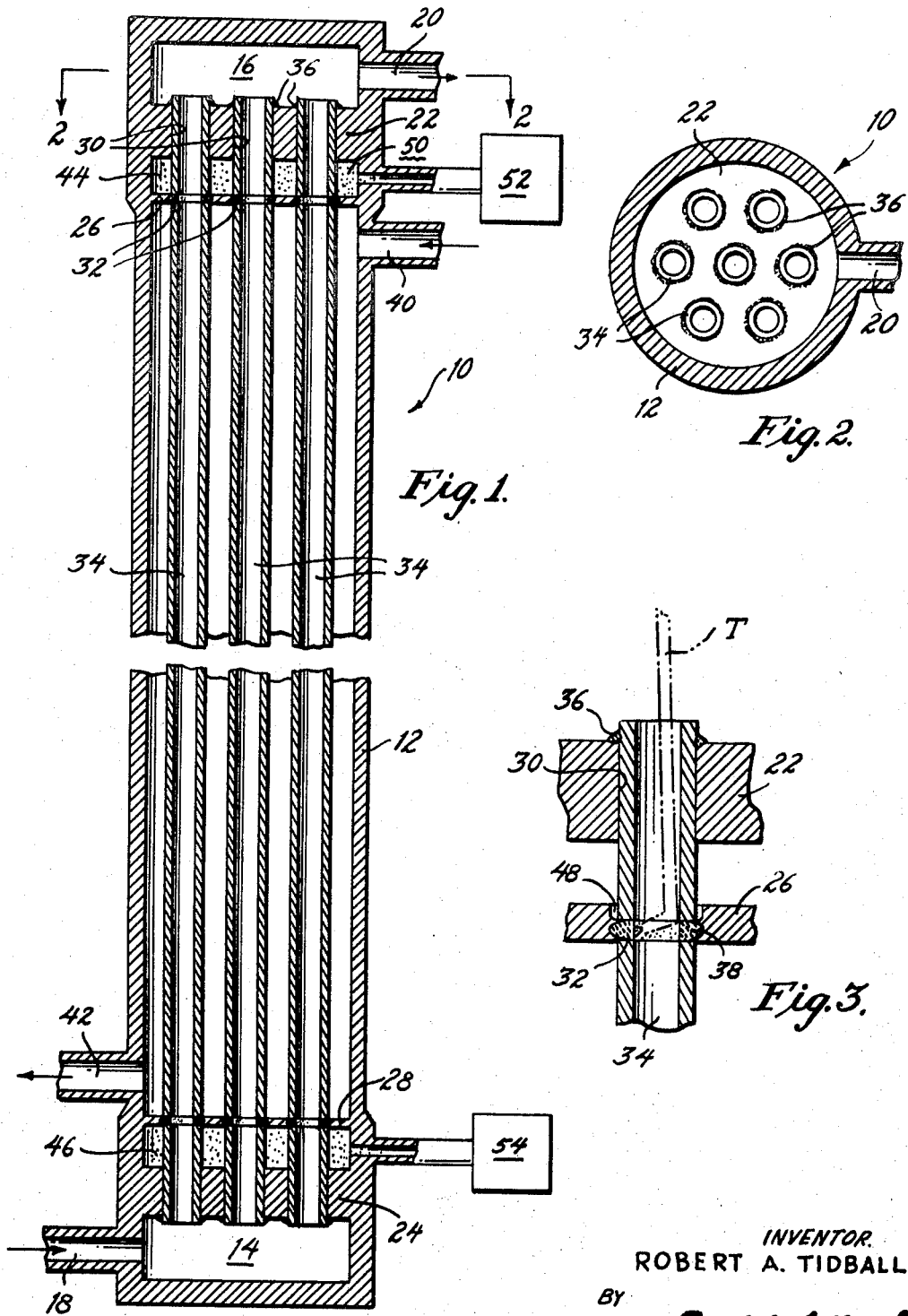

3,465,727
STEAM GENERATOR AND METHOD OF
MAKING THE SAME
Robert A. Tidball, Swarthmore, Pa., assignor to Baldwin-Lima-Hamilton Corporation, Philadelphia, Pa., a corporation of Delaware
Filed Mar. 4, 1968, Ser. No. 710,177
Int. Cl. B23p 15/26; F22b 7/00
U.S. Cl. 122—32         8 Claims

ABSTRACT OF THE DISCLOSURE

A steam generator wherein tubular members are secured by welding to spaced primary and secondary tube sheets, the welds joining the tubular members to the respective tube sheets preferably extending around the entire periphery to eliminate crevices; and a method of making a steam generator comprising the steps of providing a shell member having spaced primary and secondary tube sheets therein, securing tubular members in openings in the primary tube sheet, and securing the tubular members to openings in the secondary tube sheet in alignment with those of the primary tube sheet by welding through the walls of the tubular members.

---

This invention relates to steam generators, and more particularly, to steam generators suitable for use with liquid metals as a heating medium. This invention also relates to the method of making such steam generators.

The use of liquid metal as a heat transfer medium in power plants brings about numerous problems in design and fabrication. Liquid metal can be used at relatively low pressures, but for reasons of thermal performance, the water must be maintained at very high pressures. The water is usually converted into steam inside tubes, receiving heat from liquid metals flowing across the tubes on the "shell side" of the heat exchanger. Techniques must be used to reduce steady state and transient thermal stresses in the thick pressure members, known as tube sheets, supporting the tubes and separating steam or water from the liquid metals. This is due in part to the very high heat transfer coefficients encountered with liquid metals and the very thick parts required for high temperature steam containment.

Since the tubes used to transfer heat from the liquid metal to the water must extend through the tube sheet, and necessarily contact the liquid metal, they are usually made from expensive alloys with a high degree of quality control. The result is a cost of fabrication in excess of that for ordinary steam generators.

In recent years, the hot tube sheet of vertical generators has been insulated from the liquid metal by a blanket of inert gas, frequently three feet or more in thickness. This thickness is required to prevent liquid metal from touching any part of the tube sheet in any flow condition, steady state or transient.

It has also been proposed to provide an additional tube sheet, spaced from the conventional tube sheet, to act as a thermal shield. An example of such a construction is shown in Patent 2,915,295.

A problem with such constructions, as with conventional constructions, arises from the existence of crevices between the tubes and tube sheets. Entrance of fluids into such crevices can result in corrosion of the tubes, and "working" of the parts due to thermally induced dimensional changes causes mechanical wear.

In accordance with the principles of this invention, the tubes are secured to the usual tube sheet, and an additional tube sheet is also provided. The additional tube sheet is secured by welding to the tubes in such a manner that crevices exposed to fluid are eliminated. This is accomplished by welding through the walls of the tubes, into the additional tube sheet. Neither of the tube sheets is exposed to the full differential in temperature between the liquid metal and the water or steam. Thus, thermal stresses are minimized. The void space between the tube sheets may be provided with an inert gas at a pressure intermediate the liquid metal and water pressure, thereby providing a convenient means of monitoring for leakage of either fluid.

In view of the foregoing, it is an object of this invention to provide a novel steam generator and method of making the same.

It is another object of this invention to provide a steam generator particularly suited to use wth a liquid metal heating fluid.

It is another object of this invention to provide a steam generator wherein internal corrosion is minimized by eliminating fluid contacting crevices.

It is still another object of this invention to provide a steam generator capable of withstanding transient and steady state thermal stresses without failure.

Other objects will appear hereinafter.

The foregoing and other objects are realized by a steam generator comprising a shell, a header chamber in the shell defined in part by a tube sheet, tubes coupled to the primary tube sheet in fluid communication with the header chamber, and a secondary tube sheet in the shell spaced from the primary tube sheet and secured by welding to the tubes by welds extending through the walls of the tubes.

For the purpose of illustrating the invention, there is shown in the drawings a form which is presently preferred; it being understood, however, that this invention is not limited to the precise arrangements and instrumentalities shown.

FIGURE 1 is a longitudinal cross-sectional view, partially broken away, showing the internal construction of a steam generator in accordance with the present invention.

FIGURE 2 is a cross-sectional view taken along the line 2—2 in FIGURE 1.

FIGURE 3 is a detail view showing the manner in which the tubes of the present steam generator are secured to the tube sheets.

Referring now to the drawing in detail wherein like numerals indicate like elements, there is seen in cross-section a steam generator designated generally by the reference numeral 10. The steam generator 10 includes a cylindrical shell 12. In the illustrative embodiment, header chambers 14 and 16 are disposed at opposite ends of the shell. An inlet 18 is provided in communication with the header chamber 14, and an outlet 20 is in communication with the header chamber 16. Primary tube sheets 22 and 24 are provided at each end of the shell 12. Surfaces of the respective primary tube sheets define walls of the header chambers 14 and 16.

Respective secondary tube sheets 26 and 28 are provided, spaced from the primary tube sheets 22 and 24.

In a preferred construction, the primary and secondary tube sheets are spaced by about three to six inches.

The primary tube sheet 22 and secondary tube sheet 26 will now be described in detail, it being understood that the primary tube sheet 24 and secondary tube sheet 28 are of like construction.

Openings 30 are provided in the primary tube sheet 22. Corresponding aligned openings 32 are provided in the secondary tube sheet 26. Tubular members 34 extend through the openings 26 and 30 and span the length of the steam generator 10 between the header chambers 14 and 16. Thus, ends of the tubular members 34 remote from the ends received in the openings 30 and 32 are received in similar openings, not numbered, in the primary tube sheet 24 and secondary tube sheet 28. The tubular members 34 are secured to the primary tube sheet 22 by welds on the header chamber side of the primary tube sheet 22. The welds 36 extend around the entire periphery of the tubular members 34 and provide a water-tight seal between the tubular members 34 and primary tube sheet 22, thereby eliminating the crevice therebetween.

Welds 38 extend through the walls of the tubular members 34 into the secondary tube sheet 26. The welds 38 provide a fluid tight seal between the secondary tube sheet 26 and the tubular members 34, and eliminate the crevice therebetween. In a preferred form of the invention, as is apparent from FIGURES 1 and 3, the welds 38 cover the entire interface between the tubular members 34 and secondary tube sheets 26, 28.

The shell 12 is provided with an inlet 40 and an outlet 42, the purpose of which will be explained later.

It is now apparent that buffer chambers 44 and 46 are defined between the primary tube sheets 22, 24 and the secondary tube sheets 26, 28.

In operation, a hot liquid metal such as sodium is introduced into the inlet 40, flows downwardly within the shell 12 and around the tubular members 34, and leaves the shell 12 through the outlet 42. Highly pressurized water enters the inlet 18, passes through the header chamber 14, and enters the tubular members 34. The pressure of the water is greater than the pressure of the liquid metal. In the tubular members 34, the water is converted to steam The steam passes through the header chamber 16 and leaves the shell through the outlet 20.

The welds 36 prevent entry of moisture into crevices between the tubular members 34 and the primary tube sheet 22. Similarly, the welds 38 prevent entry of liquid metal into crevices between the tubular members 34 and the secondary tube sheet 26. Thus, the likelihood of corrosion is greatly diminished. Moreover, since only the secondary tube sheets 26 and 28 are in contact with the liquid metal, and only the primary tube sheets 22 and 24 in contact with the water or steam, neither tube sheet is subjected to the full temperature differential between the fluids. Only the primary tube sheet 22 need be designed to withstand the water and steam pressure. The likelihood of warpage of the tube sheets or the creation of great thermal stresses therein due to greatly differing temperatures on their opposite faces is greatly diminished.

Since the secondary tube sheets 26 and 28 need not be designed for the water and steam pressure, these may be relatively thin members. Since their only contact with the tubes 34 is at the welds 38, these tube sheets can withstand both transient and steady state thermal stresses without serious risk of failure. If design considerations require secondary tube sheets 26, 28 in excess of ⅜ inch, the contact area between the tubs sheets 26, 28 and tubes 34 may be sufficient to cause excessive thermal stresses in the secondary tube sheets. In this event, heat transfer can be reduced and the condition relieved by providing counterbores 48, best seen in FIGURE 3, facing the buffer chamber 44.

The buffer chambers 44 and 46 provide a ready indication of the condition of the steam generator 10. An inert gas designated generally by the reference numeral 50 may be provided in the buffer chambers 44 and 46. Detectors 52, 54 may be provided in fluid communication with the buffer chambers 44, 46 for sensing conditions in such chambers. Detectors 52, 54 may be of any type known to those skilled in the art, capable of measuring or detecting a change in any condition in the buffer chambers 44, 46 affected by fluid leakage. For example, the detectors 52, 54 may be pressure sensing devices. Normally, the inert gas 50 is at a pressure intermediate the liquid metal and header chamber pressures.

In addition to the foregoing leak-detecting function, the inert gas 50 aids in the prevention of fires in the event of leakage of the liquid metal.

Another important aspect of the present invention is the manner in which the above-described apparatus is manufactured. Manufacture is effected by first providing the shell member, including spaced primary 22, 24 and secondary 26, 28 tube sheets. The primary 22, 24 and secondary 26, 28 tube sheets are provided with corresponding aligned openings 30, 32. The tubular members 34 are placed in the aligned openings 30, 32 and secured in the openings of the primary tube sheets 22, 24, for example, by welding around the periphery of the tubular members 34 on the faces of the primary tube sheets 22, 24 away from the secondary tube sheets 26, 28. The tubular members 34 are secured to the secondary tube sheets 26, 28 by welding. This is accomplished by welding through the walls of the tubular members 34 into the secondary tube sheets 26, 28. Referring to FIGURE 3, a welding torch T is shown diagrammatically, positioned for making the weld 38. The welding can be accomplished, however, by any suitable means.

Although the above-described apparatus has been referred to as a "steam generator," it should be apparent that the foregoing method may be used to construct apparatus referred to generically as shell and tube type heat exchangers, and that the utility of apparatus constructed in accordance with the invention is not limited to the generation of steam.

The present invention may be embodied in other specific forms without departing from the spirit or essential attributes thereof and, accordingly, reference should be made to the appended claims, rather than to the foregoing specification as indicating the scope of the invention.

I claim:

1. A heat exchanger comprising a shell, a header chamber in said shell, a primary tube sheet in said shell defining a wall of said header chamber, tubular members coupled to said primary tube sheet in fluid communication with said header chamber, and a secondary tube sheet in said shell spaced from said primary tube sheet, said tubular members extending continuously through openings in said secondary tube sheet, said secondary tube sheet being fixedly secured to said tubular members by welds extending through the walls of said tubular members into said secondary tube sheet, said welds extending around the entire periphery of each of said tubular members to eliminate crevices between said tubular members and the openings in said secondary tube sheet, said primary and secondary tube sheets defining a buffer chamber therebetween.

2. A heat exchanger in accordance with claim 1 wherein said secondary tube sheet has a thickness of not more than three-eighths inch.

3. A heat exchanger in accordance with claim 1 wherein portions of the openings in said secondary tube sheet are counter-bored, said welds extending into said secondary tube sheet at remaining portions of the openings.

4. In a heat exchanger in accordance with claim 1, fluid at a first pressure in said header chamber and said tubular members, fluid at a second pressure exteriorly of said tubular members and in contact with one face of said secondary tube sheet, and an inert gas in said buffer chamber at a pressure intermediate said first and second pressures.

5. In a heat exchanger in accordance with claim 3, detection means in fluid communication with said buffer chamber for detecting pressure in said buffer chamber.

6. A method of making a heat exchanger comprising the steps of providing a shell member having spaced primary and secondary tube sheets therein, the primary and secondary tube sheets having aligned openings, securing continuous tubular members in the openings of the primary tube sheet, and securing medial portion the same tubular members in the aligned openings in the secondary tube sheet, said last-mentioned securing step comprising the further step of welding through the walls of the tubular members into the secondary tube sheet.

7. A method in accordance with claim 6 wherein said step of securing tubular members in the openings of said primary tube sheets is performed by welding around the periphery of the tubular members at a face of said primary tube sheet disposed away from said secondary tube sheet.

8. A heat exchanger in accordance with claim 1, wherein said welds cover the entire interface between said tubular members and said secondary tube sheet.

References Cited

UNITED STATES PATENTS

| | | | |
|---|---|---|---|
| 2,660,411 | 11/1953 | Weber | 165—70 |
| 2,743,089 | 4/1956 | Gardner et al. | 165—11 |
| 2,893,701 | 7/1959 | Bell | 165—11 |
| 2,996,600 | 8/1961 | Gardner et al. | 29—498 |
| 3,205,340 | 9/1965 | Gotch | 29—157.4 XR |

KENNETH W. SPRAGUE, Primary Examiner

U.S. Cl. X.R.

29—157.4